Patented Sept. 3, 1946

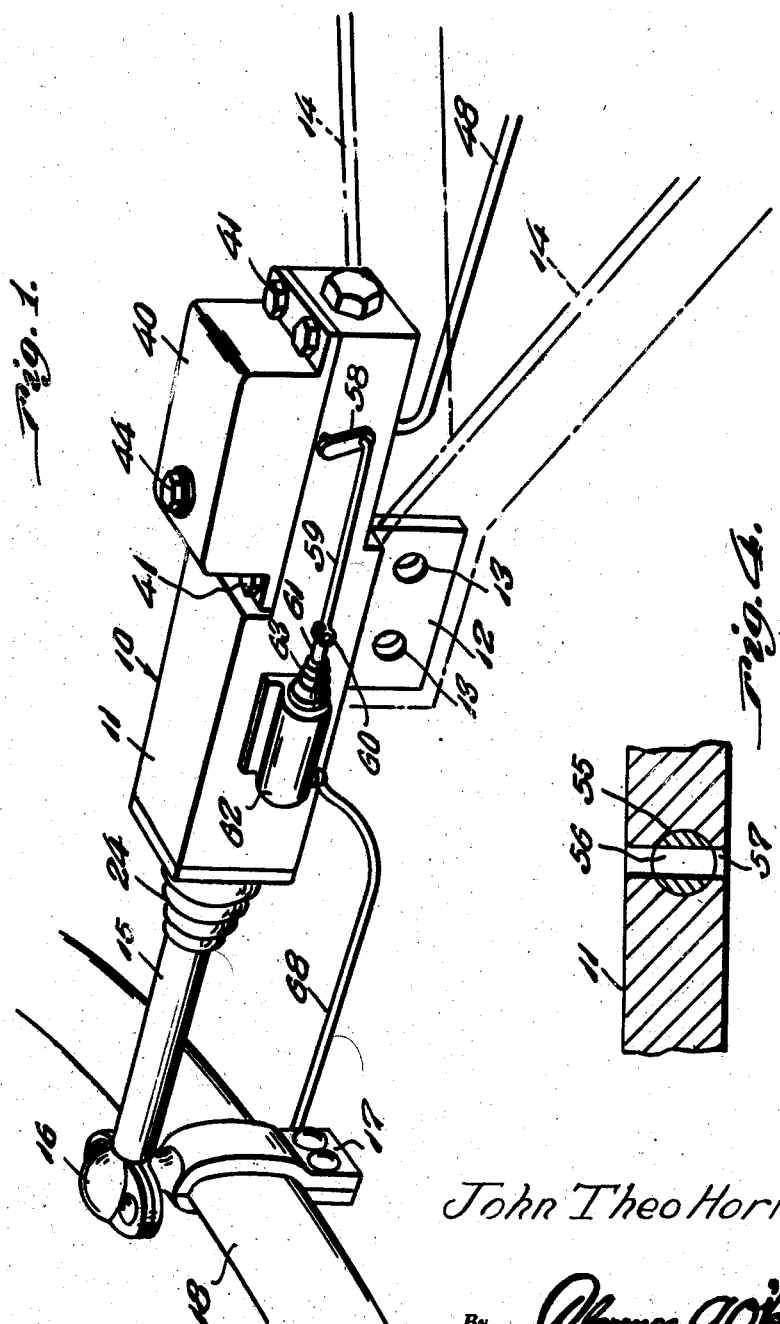

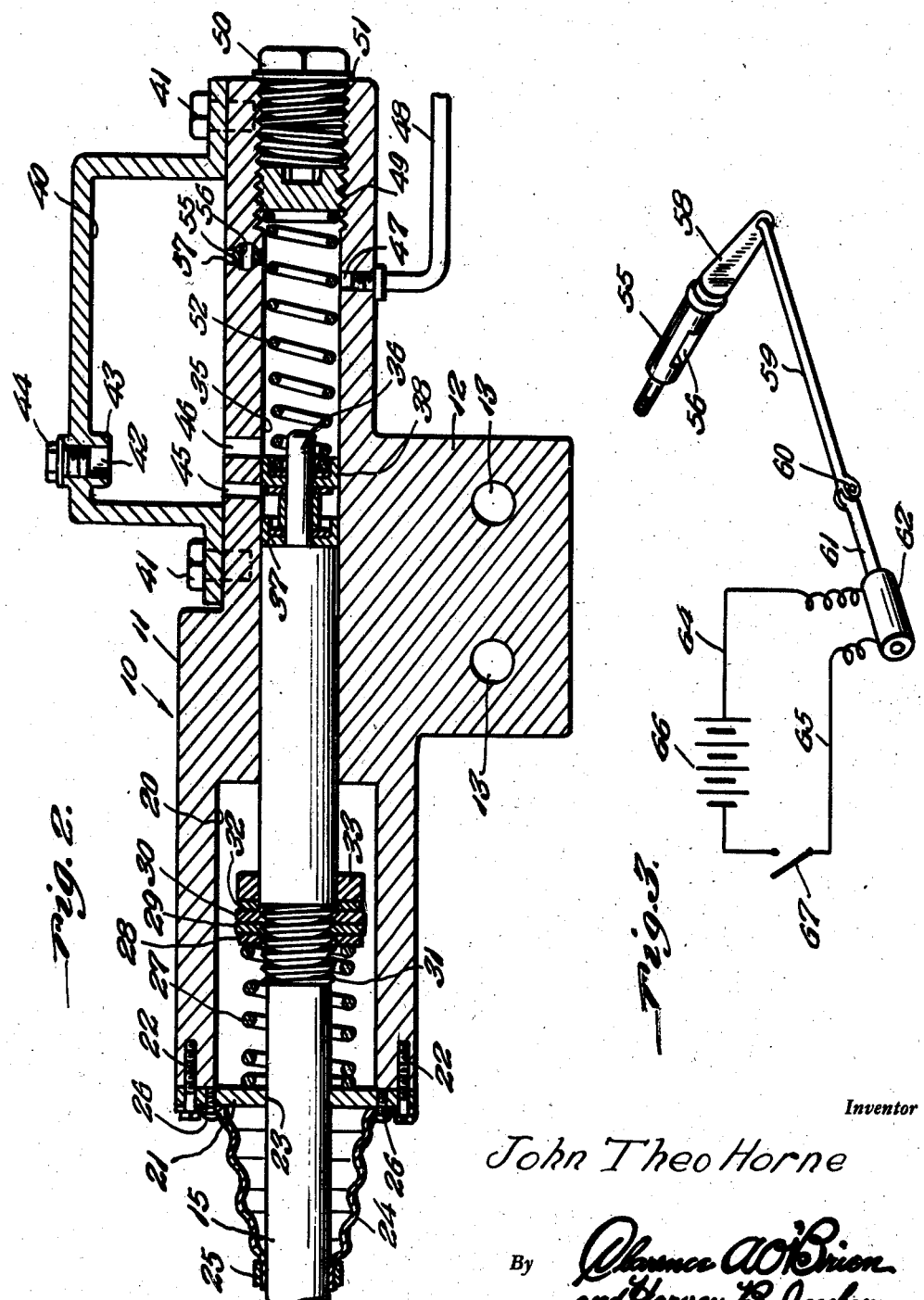

2,407,156

UNITED STATES PATENT OFFICE 2,407,156

TRAILER BRAKE

John Theo Horne, Layton, Utah

Application August 17, 1944, Serial No. 549,869

1 Claim. (Cl. 188—142)

This invention relates to a brake for trailers and like and more particularly to an actuating device for such a braking system.

A primary object of this invention is the provision of an improved mechanism actuated by the momentum of a trailer or similar vehicle for applying the brakes to a trailer when the forward speed of the towing vehicle is decreased.

An additional important object is the provision of means whereby the brake actuating mechanism may be rendered temporarily inoperative, as, for example, when backing the trailer by the towing vehicle.

A further object is the provision of means whereby the brake pressure may be readily adjusted in the system.

A still further object is the provision of a hydraulic brake actuating device which will be sturdy and durable in construction, reliable and efficient in operation, and relatively simple and inexpensive to install and manufacture.

Other objects will in part be obvious and in part be pointed out hereinafter and disclosed in the accompanying drawings wherein there is shown a preferred form of this inventive concept.

In the drawings:

Figure 1 is a perspective view showing the brake actuating mechanism of this invention as applied to a trailer and a towing vehicle.

Figure 2 is a sectional view taken longitudinally through the center of the device shown in Figure 1.

Figure 3 is a perspective view of certain constructional details shown in conjunction with the wiring diagram for operation thereof, and Figure 4 is an enlarged fragmentary sectional view of certain operating parts disclosed in Figure 2 showing the same in a different position of adjustment.

Like reference numerals refer to like parts throughout the several views of the drawings.

Having reference now to the drawings, the brake actuating device of the instant invention generally indicated at 10 is comprised of a casing 10 having a depending lug 12 with bolt holes 13 therethrough to which are adapted to be secured the towing arms 14 of a trailer of any desired type (not shown). One end of a draw-bar 15 extends outwardly from casing 11 and is adapted to be secured in any desired conventional manner to a towing vehicle. Such connection may take the form of a ball and socket type joint 16 secured to a clamp 17 adapted to be fitted to the bumper 18 of any desired type of towing vehicle (not shown). As best shown in Figure 2 a recess 20 is cut into casing 11 closed by a closure plate 21 secured thereto by heavy screws 22 engaged in suitable threaded apertures in the end wall of casing 11. Plate 21 has a centrally disposed aperture 23 therethrough through which extends draw-bar 15. A suitable dust shield 24 of rubber or similar flexible material is secured about draw-bar 15 as by a retaining ring 25 and held to cover plate 21 as by means of screws 26 to preclude the ingress of dust or other foreign matter to the interior of the mechanism.

Positioned about draw-bar 15 within recess 20 is a heavy duty compression shock spring 27 one end of which abuts the inner face of closure member 21, the other end of spring 27 is seated against a washer 28 of steel or the like positioned on draw-bar 15 and held in position by a pair of locking nuts 29 and 30 mounted on a suitably threaded portion 31 of draw-bar 15. Thus it will be seen that by varying the positions of nuts 29 and 30 the compression of the spring 27 may be varied as desired. The spring 27 is of the compression type and is normally inactive and offers no pressure on the draw-bar 15 to compress the fluid by the pistons 37 and 38 when the vehicle is stationary on level ground. Spring 27 is also heavy enough with comparison to spring 52 so that adjustment of the tension of spring 52 will have no appreciable effect on spring 27 or on draw-bar 15 when the brake is in neutral position. Positioned on the opposite side of nut 30 is a second steel collar 32 and a rubber shock washer 33, adapted to prevent possible stripping of threaded portion 31 if, for any reason the hydraulic system (to be described hereinafter) should become inoperative, and draw-bar 15 be forced inwardly until the washer strikes the bottom of recess 20. The draw-bar 15 extends into a bore 35 and terminates in a reduced portion 36 upon which are positioned and secured two spaced plunger leathers 37 and 38, the purpose of which will be described hereinafter.

A reservoir 40 for hydraulic fluid is secured as by bolts 41 to the top of casing 11 and provided with an inlet 42. A flange 43 is formed on the interior wall of the reservoir about inlet 42 in order to prevent the complete filling of the casing with hydraulic fluid in order to accommodate fluid from the hydraulic system when the pressure therein is released in a manner to be described hereinafter. Inlet 42 is interiorly threaded and is adapted to be closed as by a threaded plug 44. Intake and by-pass ports 45 and 46 are cut through the wall of casing 11 between reservoir 40 and bore 35, and an outlet port 47 leads from bore 35 to a tube 48 leading to any desired type of hydraulic braking mechanism associated with the wheels of the trailer.

The end of bore 35 is internally threaded for a substantial distance therealong and has positioned therein an adjusting nut 49. A closure nut 50 passes through a gasket 51 and serves effectively to seal the end of the bore. A spring 52 is positioned within bore 35 between the inner end of adjusting nut 49 and plunger leather 38. It will now be seen that as the speed of the towing vehicle is reduced, continued forward travel of the trailer at the same speed causes an inward telescopic movement of the draw-bar 15 and a corresponding movement of the plunger at its extremity 36 and that such plunger acting on the fluid in the brake system compresses the same to act in a known manner to apply the brakes of the trailer. When the trailer has been slowed to a degree commensurate with the speed of the towing vehicle it will be readily apparent that the load is again taken up by the draw-bar 15 and cushioned by spring 27. It will also be seen that the compression of sensitivity spring 52 may be readily adjusted by rotation of adjusting nut 49 after removal of closure nut 50 and that due to such adjustment the pressure required to operate the braking system may be varied at will.

Under certain conditions as, for example, when backing the trailer by means of the towing vehicle it is desirable that inward telescopic movement of the draw-bar 15 and its corresponding plunger should not actuate the brakes of the trailer. Accordingly, means are provided to release the pressure in the hydraulic system under such conditions at the will of the operator. Such means take the form of a valve 55 comprised of a turning plug having a slot 56 therethrough mounted for rotation in a port 57 between reservoir 40 and bore 35 and positioned at a point beyond the maximum path of travel of the plunger. Obviously, when the valve is turned to open position, that is, with aperture 56 aligned with port 57, compression of the fluid within the brake system by plunger 38 is impossible as fluid is permitted to escape through the port back into the reservoir 40 which, as previously pointed out, is never completely full in order to allow for such escape of fluid from the system when necessary. One end of the turning plug 55 extends outwardly through the side wall of casing 11 and has secured thereto a lever 58 to which is secured, pivotally, one end of a rod 59, the other end of which is pivoted as by a pivot pin 60 to the plunger 61 of a conventional solenoid contained in a casing 62 secured to the side wall of casing 11, a suitable flexible dust shield 63 being provided to preclude the ingress of foreign matter to the working parts of the solenoid. As indicated in Figure 3, suitable hot and cold lines 64 and 65 lead from a battery 66 to opposite terminals of the solenoid 62 and the flow of current is controlled by a switch 67 located in a position to be readily accessible to the driver of the vehicle. In practice it is preferred that lines 64 and 65 be contained in a suitable conduit 68. In Figure 3, switch 67 is shown in open position and correspondingly valve 55 is shown in closed position. When it is desired to open valve 55 switch 67 is closed and acts through the solenoid and its associated plunger 61 to move rod 59 and hence link 58 to rotate valve 55 to the position shown in Figure 4. When it is desired to return the trailer brakes to service, switch 67 is opened and the current energizing the solenoid accordingly cut-off whereupon the valve 55 is returned to closed position in any desired manner as by a compression spring within casing 62 acting on plunger 61.

Now from the foregoing it will be seen that there is herein provided a trailer brake actuating mechanism which accomplishes all the objects of this invention and others including many advantages of great practical utility and commercial importance.

As many embodiments may be made of this inventive concept and as many modifications may be made in the embodiment hereinbefore described and shown in the accompanying drawings, it is to be understood that all matter herein is to be interpreted merely as illustrative and not in a limiting sense.

I claim:

A combined trailer hitch and brake actuating mechanism which includes a casing adapted to be attached to the towing arms of a trailer vehicle, said casing having an axial bore opening adjacent one end into an enlarged chamber, a plug closing the end of the bore opposite that opening into the chamber to form a fluid tight joint, a draw bar, one end of the draw bar being adapted to be attached to a towing vehicle, the opposite end of said draw bar telescopically entering the bore in the casing, means yieldingly connecting the draw bar to the casing, so that when pull is exerted on the draw bar the casing will be moved, non-compressible fluid within the bore between the end of the draw bar and the plug, a pipe connecting the bore in the casing with the braking system on a trailer vehicle whereby when the draw bar telescopes into the bore the fluid contained therein will be forced into the braking system on the trailer vehicle to set the brakes thereon and manually controlled means to by-pass the fluid and avoid building pressure in the trailer vehicle braking system when the trailer is being backed by the towing vehicle.

JOHN THEO HORNE.